(12) United States Patent
Momose

(10) Patent No.: US 7,300,513 B2

(45) Date of Patent: Nov. 27, 2007

(54) COMPOSITION FOR COATING AND COATING FILM OBTAINED THEREFROM

(75) Inventor: Fukashi Momose, Ginowan-si (JP)

(73) Assignees: Masataka Tanaka, Osaka (JP); Yoshiro Tanaka, Osaka (JP)

( * ) Notice: Subject to any disclaimer, the term of this patent is extended or adjusted under 35 U.S.C. 154(b) by 0 days.

(21) Appl. No.: 11/266,720

(22) Filed: Nov. 3, 2005

(65) Prior Publication Data

US 2007/0095254 A1 May 3, 2007

(51) Int. Cl.
*C04B 28/26* (2006.01)
*C04B 12/04* (2006.01)

(52) U.S. Cl. ...................... 106/600; 106/2; 106/18.12; 106/623; 106/624; 106/629; 106/631; 106/636; 252/517

(58) Field of Classification Search ................ 106/600, 106/623, 624, 631, 636, 2, 18.12, 629; 252/517
See application file for complete search history.

(56) References Cited

U.S. PATENT DOCUMENTS 2,695,943 A * 11/1954 Cape et al. ................ 428/563

FOREIGN PATENT DOCUMENTS

JP 7-62264 A * 3/1995

OTHER PUBLICATIONS

"Water Glass" H. Meyer, Translated by S. Okuda. First edition, 1950, (no month) published by Corona Publications, p. 60.

* cited by examiner

*Primary Examiner*—Anthony J. Green
(74) *Attorney, Agent, or Firm*—Jordan and Hamburg LLP

(57) ABSTRACT

Provided is a composition for coating that can form a waterproof siliceous coating film. To impart water resistance to a film formed by binder of alkali silicate, radioactive material is used in combination with the binder. Additionally, inorganic filler, inorganic body pigment, inorganic color pigment, additive, and water are used in combination, thereby attaining a coating film that combines water resistance, acid resistance, and non-flammability.

12 Claims, No Drawings

COMPOSITION FOR COATING AND COATING FILM OBTAINED THEREFROM

BACKGROUND OF THE INVENTION

1. Field of the Invention

The present invention relates to a composition for coating and, more particularly, to a composition that can form a coating film having water resistance, acid resistance and non-flammability merely by applying it to the surface of metal such as aluminum, stainless steel and iron, or the surface of a base material such as concrete, ceramic, stone, cement manufacture, wood, paper, and fabric, or the surface of an inorganic coating film, and then performing air-drying or heating at low temperatures for a short period of time. This coating film can therefore contribute to the corrosion prevention of concrete buildings, the corrosion prevention of metals, and the prevention of spreading fire and smoke pollution during a fire.

2. Description of the Background Art

A variety of compositions for coating (hereinafter referred to simply as a "composition"), which are used for forming a coating film that combines water resistance, acid resistance and non-flammability on the surface of a base material, have traditionally been proposed, and various compositions using binder of alkali silicate are disclosed.

Specifically, it is known that alkali silicate such as sodium silicate, potassium silicate and lithium silicate can form a dry film or cured film by air-drying or heating at temperatures of 500 to 800° C. Although these are used as binder for forming a coating film having acid resistance and non-flammability, there is a problem that a film formed by drying alkali silicate at ordinary temperatures has poor water resistance. Therefore, in order to impart water resistance to a film formed by a composition using alkali silicate as binder, there has been proposed a method of using a composition in combination with acid or basic material as curing agent. In other words, alkali silicate exhibits alkality in strong acid solution, and hydrate of silicate in pure water acts as acid (see page 60, "Water Glass" written by Meyer. H., translated by Susumu Okuda, first edition, 1950, issued by CORONA PUBLISHING CO., LTD.). Hence, acid and basic materials have been useful as curing agent.

However, the use along with curing agent has the following problems. That is, a composition combined with curing agent will be solidified, and hence it has poor long-term shelf life. This involves such operational complications that curing agent must be incorporated in a composition for each coating operation.

Here, it is known that a composition in combination with curing agent has the property of setting to gel for a short period of time and loosing fluidity; and that the speed at which the composition sets to gel is affected by the type of curing agent and the amount of addition and temperature conditions of curing agent. Therefore, when coating a composition combined with curing agent, the gelation of the composition will interfere with coating operation. Consequently, there arises such complications in handling that, to retard the speed at which the composition sets to gel, it is necessary to make adjustment such as the determination of the type of curing agent or the modification of the amount of addition of curing agent.

SUMMARY OF THE INVENTION

In view of the problems in the above conventional technique, the present invention has as its object to provide a composition that may be used for such purposes as could not be handled satisfactorily in the past, by virtue of the following characteristics: (1) It is possible to omit such operations as needed in the past that, in order to form a cured coating film, the type of curing agent is selected, the amount of the curing agent is measured, and the curing agent is then added to and mixed with a composition, for each coating operation; (2) This composition can be preserved stably for a long period of time by cutting off the atmosphere (water vapor and carbon dioxide); (3) This composition can form a cured coating film by having it make a contact with the atmosphere, and can be cured by heating at ordinary temperatures or low temperatures (40 to 100° C.); (4) This composition can form a coating film excellent in water resistance and non-flammability; (5) This composition can form a coating film having the function of generating the negative ion, thus being effective in deodorization, antibacterial activity, and organic matter decomposition; and (6) The composition does not set to gel rapidly, permitting excellent operating performance.

The invention is a composition for coating obtained by incorporating radioactive material (b) in alkali silicate (a) that can be expressed by the general formula of $M_2O\ .\ nSiO_2$, (provided M is alkali metal, namely Na, K, and Li; and n is a natural number), and imparting water resistance to a film formed by the alkali silicate (a). The invention is also a composition for coating that contains 1 to 25 parts by weight, in terms of $SiO_2$, of the alkali silicate (a), 0.1 to 30 parts by weight of the radioactive material (b), and further 0 to 70 parts by weight of inorganic filler (c), and 3 to 90 parts by weight of water (d), provided (a)+(b)+(c)+(d)=100 parts by weight. Specifically, the gist of the invention resides in that the radioactive material (b) is mixed with the alkali silicate (a) and allowed to act thereon so as to form a waterproof bound film, containing 1 to 25 parts by weight, in terms of $SiO_2$, of the alkali silicate (a), 0.1 to 30 parts by weight of the radioactive material (b), and 0 to 70 parts by weight of inorganic filler (c), and 3 to 90 parts by weight of water (d), provided (a)+(b)+(c)+(d)=100 parts by weight.

The composition for coating of the invention produces the following effects. (1) This composition can form a waterproof film with alkali silicate as binder, and the absence of flammable material enables a nonflammable coating film to be formed. Therefore, this composition can be applied to the surface of a flammable base material such as wood, paper, fabric, and the like, so that it can be used for the purpose of imparting non-flammability to a base material;

(2) This composition can form a hard, nonflammable, and transparent or colored coating film by applying and having it penetrate a porous base material such as concrete, slate plate and stone, alternatively, by applying it to the surface of a metal base material such as zinc, iron and stainless steel. This protects the base material from fire and abrasion, or is suitable for coloring;

(3) It is known that since the formed film of organic binder is already chemically decomposed by the organic boding hand cutting action of the negative ion, it deteriorates and then soon collapses if mixed with or used along with radioactive material. In contrast, with the composition of the invention, the formed film of alkali silicate is inorganic and does not collapse by the negative ion. Hence, this composition is best used for forming a coating film having the negative ion generating function by applying it to a base material such as concrete, stone, wood, paper, fabric, and the like. That is, this composition can be used for coating purposes intended for non-flammable activity and deodorization; and (4) In coating, there is no need to mix curing agent, thus eliminating annoyance with regard to the measuring and mixing of curing agent.

DESCRIPTION OF THE PREFERRED EMBODIMENTS

The components of a composition for coating according to the present invention will be described in detail.

Alkali silicate (a) used in the invention is silicate compound that can be expressed by the general formula of $M_2O \cdot nSiO_2$ (provided M is alkali metal, namely Na, K, and Li; and n is a natural number), specifically, sodium silicate, potassium silicate, and lithium silicate, and that can form a thin film and act as binder, when dried at ordinary temperatures or by heating. Provided the alkali silicate (a) is usually used in the form of aqueous solution. Therefore, the film that can be obtained by drying only the component (a) at ordinary temperatures or by heating at low temperatures is a film that can be obtained by dehydration, thus lacking water resistance. Consequently, a composition using the component (a) as binder is unsuitable for coating purposes requiring water resistance.

The present invention is based on the finding that a waterproof film can be obtained by incorporating a component (b), namely radioactive material, in the alkali silicate (a). This eliminates the operation of combining a specific curing agent (described later) with the component (a). Specifically, when a composition with the alkali silicate (a) as binder is used in combination with the component (b), although the component (b) is material that belongs to neither acid nor basic, there arises such a phenomenon of imparting water resistance to the formed coating film of the composition. Although it is difficult to specify the reason that the radioactive material imparts water resistance to the formed film of the component (a), it can be presumed that the following actions have an effect on this. That is, there are known that, when the radioactive material (b) makes a direct contact with water vapor mass and carbon dioxide concurrently in the atmosphere, radiation-chemical reaction occurs; and that, in this reaction process (radiation-chemical reaction process), hydrogen peroxide ($H_2O_2$) is generated on a contact surface of the component (b), and the negative ion ($H^+$) is released in the atmosphere. Accordingly, the hydrogen peroxide and the negative ion generated in the radiation-chemical reaction process, and carbon dioxide (double bond electron of carbon dioxide) act solely or jointly, so that the alkali silicate (a) can form waterproof silicate (see the article of "Polymerization of Silica" in the aforesaid book by Meyer).

The proportion of the component (a) of the invention is, in terms of $SiO_2$, 0.1 to 30 parts by weight, preferably 0.5 to 20 parts by weight. Under 0.5 parts by weight, bonding strength may be poor. Over 20 parts by weight, it may take long for a coating film to have water resistance.

Component (b), namely radioactive material, used in the invention is in the form of natural ore that generates radiation, or ceramic. As natural ore, there are materials containing an element that belongs to uranium series, actinium series, or thorium series. There are also ceramics adjusted by using these materials.

The radioactive material (b) is necessary for allowing radiation to act on the alkali silicate (a), thereby imparting water resistance to a solidified film of the component (a).

It is desirable that the radioactive material (b) is in a fabric or particle shape. Its average particle length or average particle diameter is not more than 100 μm, more preferably not more than 5 μm, without limiting to this. The average particle length or average particle diameter of not more than 0.1 μm is advantageous for a composition intended for purposes where it penetrates a base material. Over 10 μm, the coating film may have a rough surface.

It is desirable for safety in practice that the intensity of radiation of radioactive material (b) is not more than 370 becquerel/g, which is not applicable to the regulation of the legislation regarding handling. More specifically, it is preferable to use radioactive material whose radiation equivalent is 0.5 to 10 μSv (provided it is a value measured by placing a Geiger counter at a position that is 5 mm away from the radioactive material). Below 0.5 μSv, it takes long for imparting water resistance to a film formed by the component (a), which is unpractical. Over 10 μSv, the radiation is harmful to the human body, and it is therefore advisable not to use such material.

The proportion of the radioactive material (b) in a composition can change depending on the dimension of the radiation equivalent of the component (b). On the basis of radiation equivalent of 3 to 8 μSv (provided it is a measured value obtained by the above measuring method), it is 0.2 to 20 parts by weight, more preferably 0.5 to 10 parts by weight. On the other hand, exceeding 10 parts by weight will be uneconomical because there is no significant difference in the speed of imparting water resistance to the coating film of the composition.

To speedily allow the coating film to have water resistance, it is preferable to increase the amount of addition of the component (b) in proportion to the amount of $SiO_2$ in a composition.

Component (c), namely inorganic filler, used in the invention is preferably non-water-soluble and in the shape of particle or fabric. Its average particle length or average particle diameter is 0.1 to 100 μm, more preferably not more than 0.5 to 30 μm. Below 0.5 μm, it is useful for purposes where a composition is allowed to permeate a base material. Over 30 μm, the coating film may have a rough surface.

As inorganic filler, there are inorganic body pigment, inorganic pigment, and metal powder. One or more than one type selected from this group may be used as required.

Examples of inorganic body pigment are silica, talc, mullite, silicon carbide, kaolin, and various whiskers. Examples of inorganic pigment are oxides of titanium, chrome, iron, manganese, and cobalt, as well as dual composite oxides consisting of one of these and aluminum. Examples of metal powder are tin, zinc, stainless steel, and nickel powders. These are cited merely by way of example and without limitation.

The proportion of the inorganic filler (c) in a composition is preferably 0 to 70 parts by weight, more preferably 0 to 40 parts by weight. Over 40 parts by weight, the fluidity of the composition will deteriorate, so that irregularities may occur in a coating film and operating performance may be lowered.

The inorganic filler (c) is necessary for maintaining the thickness of a coating film formed by a composition, or performing coloring of a coating film. Hence, the component (c) can be omitted when a composition is allowed to permeate a base material, or when no coloring is required.

Component (d), namely water, used in the invention is necessary for adjusting the viscosity of a composition, or the dispersion of the radioactive material (b) and the inorganic filler (c). Ion water, distilled water, and tap water can be used.

The proportion of water (d) in a composition is preferably 3 to 90 parts by weight, more preferably 30 to 70 parts by weight. Under 30 parts by weight, the ratio of alkali silicate (a), radioactive material (b), or inorganic filler (c) is increased thereby to lower the permeability or application performance with respect to a base material, and further cause such a disadvantage that a coating film cannot turn into water resistance speedily. Over 70 parts by weight of the component (d), the bonding strength is lowered to cause a coating film to be brittle in some cases. Note that the component (d) includes the water contained in the component (a).

The present invention aims at imparting water resistance to a coating film formed by a composition by having radioactive material (b) act on alkali silicate (a). Therefore, the composition of the invention does not become insoluble solidified matter unless it is exposed to the atmosphere so as to make a contact with water vapor mass and carbon dioxide. This composition can exhibit excellent long-term shelf life merely by sealing it. There is also the characteristic that the composition can be used without the operations related to the selection of curing agent, and the measuring and mixing of curing agent.

In a conventional manner, to impart water resistance to alkali silicate (a), acid or basic material is combined with the component (a) so as to use as curing agent. Specifically, acid material such as hydrochloric acid, aluminate, phosphoric acid, or basic material such as magnesium oxide, zinc oxide, iron hydoroxide, barites, aluminum salt is used in combination with the component (a). However, when such curing agent is combined and mixed with a composition with the component (a) as binder, the composition will set to gel, and hence the fluidity of the composition will be eliminated. This causes the disadvantages that operating performance is lowered, and that the composition incorporating curing agent cannot be preserved for a long period of time. Accordingly, the present invention aims at solving these problems.

The coating film formed by the composition of the invention is waterproof, acid proof and nonflammable, and also has the negative ion generating function, thereby having wide applications. For example, it can be used in corrosion-resistant/weather-resistant decorative film for metal and concrete, nonflammable decorative film, thermal degradation preventing film, and fire-resistant film for wood and paper. In addition, the negative ion generated from these films is available for the fields of deodorization, fat splitting, and the like.

EXAMPLES

The present invention will be discussed more specifically with reference to examples. However, it is to be understood that it is not limited to the following examples, provided they do not exceed the scope of the invention. In the examples, "unit (part)" and the symbol "%" are on the basis of weight, unless otherwise noted.

The symbols used for representing components in the following tables indicate as follows:

(a) Alkali Silicate

N: J-sodium silicate #3, (about 30% in $SiO_2$ concentration), manufactured by Nippon Chemical Ind.

K: 1K potassium silicate (about 30% in $SiO_2$ concentration), manufactured by Nippon Chemical Ind.

L: lithium silicate #45 (about 20% in $SiO_2$ concentration), manufactured by Nippon Chemical Ind.

(b) Radioactive Material

M: monazite ore (natural radioactive material manufactured by Serayamaichi, which is 1 μm in average particle diameter, and 5 to 7 μSv/5 mm of measuring distance in radiation dose equivalent)

S: ceramic (composed of 38% moinazite, 28% anatase type titanium dioxide, and 34% China clay, which is 1 μm in average particle diameter, and 2 to 4 μSv/5 mm of measuring distance in radiation dose equivalent)

(c) Inorganic Filler

C: chromium oxide (0.5 μm in average particle diameter, green coloring agent)

T: talc (1 m in average particle diameter)

Z: zinc powder (2 μm in average particle diameter)

(d) Water

W: ion water

Experiment 1

Adjusted were 30 compositions shown in Tables 1, 2, and 3. In adjusting the compositions, each of the components as shown in the tables was put in an agitator and agitated for 20 minutes at 200 r.p.m (revolutions per minute). This was then taken out and filtered with a 100-mesh sieve.

TABLE 1

| Type of Composition | Mixing Component | | | | | | | Total parts |
|---|---|---|---|---|---|---|---|---|
| | N | M | S | C | T | Z | W | |
| N-B1 | 10 | | | | | | 90.0 | 100 |
| N-1 | 10 | 0.5 | | | | | 89.5 | 100 |
| N-2 | 10 | | 0.5 | | | | 89.5 | 100 |
| N-3 | 10 | 5.0 | | | | | 85.0 | 100 |
| N-4 | 10 | | 5.0 | | | | 85.0 | 100 |
| N-B2 | 30 | | | 5.0 | 5.0 | 5.0 | 55.0 | 100 |
| N-5 | 30 | 5.0 | | 5.0 | 5.0 | 5.0 | 55.0 | 100 |
| N-6 | 30 | | 5.0 | 5.0 | 5.0 | 5.0 | 50.0 | 100 |
| N-B3 | 30 | 2.5 | 2.5 | | | | 65.0 | 100 |
| N-7 | 30 | 2.5 | 2.5 | 5.0 | 5.0 | 5.0 | 50.0 | 100 |

Provided N-B1 is blank.

TABLE 2

| Type of Composition | Mixing Component | | | | | | | Total parts |
|---|---|---|---|---|---|---|---|---|
| | K | M | S | C | T | Z | W | |
| K-B1 | 10 | | | | | | 90.0 | 100 |
| K-1 | 10 | 0.5 | | | | | 89.5 | 100 |
| K-2 | 10 | | 0.5 | | | | 89.5 | 100 |
| K-3 | 10 | 5.0 | | | | | 85.0 | 100 |
| K-4 | 10 | | 5.0 | | | | 85.0 | 100 |
| K-B2 | 30 | | | 5.0 | 5.0 | 5.0 | 55.0 | 100 |
| K-5 | 30 | 5.0 | | 5.0 | 5.0 | 5.0 | 55.0 | 100 |
| K-6 | 30 | | 5.0 | 5.0 | 5.0 | 5.0 | 50.0 | 100 |
| K-B3 | 30 | 2.5 | 2.5 | | | | 65.0 | 100 |
| K-7 | 30 | 2.5 | 2.5 | 5.0 | 5.0 | 5.0 | 50.0 | 100 |

Provided K-B1 is blank.

TABLE 3

| Type of Composition | Mixing Component | | | | | | | Total parts |
|---|---|---|---|---|---|---|---|---|
| | L | M | S | C | T | Z | W | |
| L-B1 | 10 | | | | | | 90.0 | 100 |
| L-1 | 10 | 0.5 | | | | | 89.5 | 100 |
| L-2 | 10 | | 0.5 | | | | 89.5 | 100 |

TABLE 3-continued

| Type of Composition | Mixing Component L | M | S | C | T | Z | W | Total parts |
|---|---|---|---|---|---|---|---|---|
| L-3 | 10 | 5.0 | | | | | 85.0 | 100 |
| L-4 | 10 | | 5.0 | | | | 85.0 | 100 |
| L-B2 | 30 | | | 5.0 | 5.0 | 5.0 | 55.0 | 100 |
| L-5 | 30 | 5.0 | | 5.0 | 5.0 | 5.0 | 55.0 | 100 |
| L-6 | 30 | | 5.0 | 5.0 | 5.0 | 5.0 | 50.0 | 100 |
| L-B3 | 30 | 2.5 | 2.5 | | | | 65.0 | 100 |
| L-7 | 30 | 2.5 | 2.5 | 5.0 | 5.0 | 5.0 | 50.0 | 100 |

Provided L-B1 is blank.

Each of the 30 compositions shown in Tables 1 to 3 was applied by spray to three iron plates (size: 70 mm×150 mm×1.2 mm), the weight of which was previously measured, and then allowed to stand indoors (room temperature 25° C., relative humidity 58%) for five days, so that the composition was dried to form a coating film. Thereafter, the weight was measured again to calculate the weight (g) of the composition attached to each of the iron plates. Each of the iron plates was then immersed in distilled water. After 24 hours, each plate was taken out of the water, and put in a drying oven to dry it. The weight of each plate was measured to calculate the amount of decrease of the composition attached to the plate, and the average amount of decrease (%) of the compositions applied to the three iron plates was calculated. The results are shown in Table 4.

TABLE 4

| Type of Composition | Average loss value (%) | Type of Composition | Average loss value (%) | Type of Compo-sition | Average loss value (%) |
|---|---|---|---|---|---|
| N-B1 | 36.28 | K-B1 | 28.33 | L-B1 | 16.07 |
| N-1 | 11.25 | K-1 | 10.48 | L-1 | 7.79 |
| N-2 | 17.99 | K-2 | 14.64 | L2 | 9.52 |
| N-3 | 8.41 | K-3 | 5.77 | L-3 | 3.22 |
| N-4 | 9.67 | K-4 | 8.12 | L-4 | 6.15 |
| N-B2 | 45.82 | K-B2 | 31.78 | L-B2 | 25.93 |
| N-5 | 5.03 | K-5 | 4.41 | L-5 | 3.33 |
| N-6 | 8.46 | K-6 | 6.17 | L-6 | 4.09 |
| N-B3 | 9.71 | K-B3 | 8.29 | L-B3 | 3.76 |
| N-7 | 8.43 | K-7 | 7.00 | L-7 | 3.30 |

Provided B1 is blank.

Experiment 1 has disclosed that the radioactive material has the effect of imparting insolubility to the formed film of alkali silicate.

Experiment 2

The same composition as in Experiment 1 was applied to the dried slate plate (size: 300 mm×300 mm×5 mm) and dried by allowing it to stand indoors for three days. A negative ion measuring apparatus (ITC-201A, manufactured by Alps Electric Co., Ltd.) was placed to measure the amount of the negative ion generated from the coating film. The results are shown in Table 5.

Provided the numerical value (piece/cc) of the negative ion amount shown in the table was obtained by correcting the measured value of the negative ion amount generated from the coating film, based on the previously measured spontaneous negative ion amount existing indoors.

TABLE 5

Measured values of the negative ion amount (Measuring Conditions: Room temp: 26° C.; Relative humidity: 54% Illumination: 60-lux/fluorescent lamp)

| Type of Composition | Measured Value piece/cc | Type of Composition | Measured Value piece/cc | Type of Composition | Measured Value piece/cc |
|---|---|---|---|---|---|
| N-B1 | 70 and below | K-B1 | 70 and below | L-B1 | 70 and below |
| N-1 | 1870 | K-1 | 1760 | L-1 | 1930 |
| N-2 | 1120 | K-2 | 1200 | L2 | 1270 |
| N-3 | 6370 | K-3 | 6670 | L-3 | 6140 |
| N-4 | 5280 | K-4 | 5420 | L-4 | 4970 |
| N-B2 | 70 and below | K-B2 | 70 and below | L-B2 | 70 and below |
| N-5 | 6520 | K-5 | 6390 | L-5 | 6450 |
| N-6 | 5330 | K-6 | 5930 | L-6 | 5180 |
| N-B3 | 4430 | K-B3 | 4620 | L-B3 | 4270 |
| N-7 | 4390 | K-7 | 4310 | L-7 | 4110 |

Experiment 3

To examine the effect of deodorizing action on the negative ion generated from each of the coating films formed by the compositions of the invention, 3-L ammonia gas adjusted to a predetermined concentration was admitted in two Tedlar-bags. A piece of drawing paper (size: 300 mm×300 mm×5 mm), to both sides of which 35 g of the composition adjusted in Experiment 1 was applied previously, was put in one of the two Tedlar-bags. The other Tedlar-bag was empty (blank). The concentrations of ammonia in the two Tedlar-bags were measured per elapsed time by a detector tube, and the measured values were compared. The types of compositions and the results of measurements are shown in Table 6.

TABLE 6

(Measuring Conditions: Room temp: 25° C.; Under irradiation of 500-lux fluorescent lamp)

| Type of Composition | Concentration of ammonia (ppm) Initial concentration | After 2 hours | After 24 hours |
|---|---|---|---|
| Blank | 40. | 34. | 23. |
| N-1 | 40. | 13. | Not more than 0.5 |
| N-2 | 40. | 20. | Not more than 0.5 |
| N-5 | 40. | 2. | Not more than 0.5 |

TABLE 6-continued

| (Measuring Conditions: Room temp: 25° C.; Under irradiation of 500-lux fluorescent lamp) | | | |
|---|---|---|---|
| | Concentration of ammonia (ppm) | | |
| Type of Composition | Initial concentration | After 2 hours | After 24 hours |
| N-6 | 40. | 3. | Not more than 0.5 |
| K-1 | 40. | 12. | Not more than 0.5 |
| K-2 | 40. | 21. | Not more than 0.5 |
| K-5 | 40. | 2. | Not more than 0.5 |
| K-6 | 40. | 4. | Not more than 0.5 |
| L-1 | 40. | 15. | Not more than 0.5 |
| L-2 | 40. | 20. | Not more than 0.5 |
| L-5 | 40. | 3. | Not more than 0.5 |
| L-6 | 40. | 3. | Not more than 0.5 |

Experiment 3 has disclosed that the coating films formed by the compositions of the invention have deodorizing action.

Experiment 4

To examine how effectively the negative ion generated from the coating film formed by the composition of the invention can perform the action of decomposing organic matter, red ink (organic dye) was added dropwise to each of the coating films of the compositions adjusted in Experiment 2. The state in which the red ink was decomposed and faded away was observed with the naked eye, in order to determine the number of days necessary for the color of the ink to fade out. The results are shown in Table 7. This red ink was prepared by diluting a cartridge spare ink (product number IRF-12S-R), manufactured by PILOT Corporation, with 15 times distilled water. With use of a syringe, 0.2 cc was added dropwise onto each of the coating films of the compositions.

TABLE 7

| (Measuring Conditions: Under irradiation of indoor fluorescent lamp) | | |
|---|---|---|
| Type of Composition | Amount of application of Composition (g/piece) | Number of days necessary for red color to fade out |
| Blank (slate plate) | — | Red color remained after 240 days |
| N-1 | 24. | Within 60 days |
| N-2 | 25. | Within 60 days |
| N-3 | 24. | Within 40 days |
| N-4 | 26. | Within 40 days |
| N-5 | 24. | Within 40 days |
| N-6 | 25. | Within 60 days |

Experiment 4 has disclosed that the coating films formed by the compositions of the invention generate the negative ion, and have the effect of eliminating the coloring function of organic dye, thus exhibiting the action of decomposing organic matter.

Experiment 5

To examine the effect of the antibacterial action of the negative ion generated from each of the coating films formed by the compositions of the invention, evaluation was made in the following manner. That is, *Escherichia coli, Pseudomonas aeruginosa*, yellow *Staphylococcus*, and Methicilin-Resistant *Staphylococcus Aureus* (MRSA) were respectively added dropwise to individual stainless steel plates (size: 70 mm×70 mm×1.8 mm), on which the compositions (N-5, K-5, and L-5) of the invention was previously coated. After allowing these to stand for one hour, liquid bacteria was recovered by an applicator. Then, the number of bacteria at the time of dropping and that at the time of recovery were compared by microscopy, thus calculating the rate of decrease of bacteria.

Method of Calculating Rate of Decrease of Bacteria:

Rate of Decrease of Bacteria (%)={(Number of bacteria in recovered liquid bacteria)÷(Number of bacteria in liquid bacteria at the time of dropping)}×100

The results of the experiment was shown in Table 8, provided "blank" indicates the rate of decrease of bacteria in case of using a stainless steel plate without coating.

TABLE 8

| (Measuring Conditions: Room temp: 25° C.; Under irradiation of 1000-lux fluorescent lamp) | | | | |
|---|---|---|---|---|
| | Type of bacteria Rate of decrease of bacteria after one hour (%) | | | |
| Type of Composition | *Escherichia coil* | *Pseudomonas aeruginosa* | Yellow *Saphylococcus* | MRSA |
| Blank | 0. | 0. | 0. | 0. |
| N-5 | 99.9 | 99.9 | 99.9 | 99.9 |
| K-5 | 99.9 | 99.9 | 99.9 | 99.9 |
| L-5 | 99.9 | 99.9 | 99.9 | 99.9 |

Experiment 5 has disclosed that the coating films formed by the compositions of the invention exhibit antibacterial property against *Escherichia coli, Pseudomonas aeruginosa*, yellow *Staphylococcus*, and MRSA.

Experiment 6

Each of the compositions of the invention was applied to a stainless steel plate (size: 70 mm×150 mm×1.2 mm), and dried by allowing it to stand indoors for 24 hours. The obtained coating film was exposed to the flame of a gas burner (at temperatures of about 800° C.) for 60 seconds, in order to examine the presence or absence of fuming, the presence or absence of the coating film peeling, and the change of appearance (the presence or absence of burning trace). The results were shown in Table 9.

TABLE 9

| Type of Composition | Fuming | Coating Film peeling | Burning trace |
|---|---|---|---|
| N-1 | Nil | Nil | Nil |
| N-2 | Nil | Nil | Nil |
| N-3 | Nil | Nil | Nil |
| N-4 | Nil | Nil | Nil |
| N-5 | Nil | Nil | Nil |
| N-6 | Nil | Nil | Nil |
| N-7 | Nil | Nil | Nil |
| K-1 | Nil | Nil | Nil |
| K-2 | Nil | Nil | Nil |
| K-3 | Nil | Nil | Nil |
| K-4 | Nil | Nil | Nil |
| K-5 | Nil | Nil | Nil |
| K-6 | Nil | Nil | Nil |
| K-7 | Nil | Nil | Nil |
| L-1 | Nil | Nil | Nil |
| L-2 | Nil | Nil | Nil |
| L-3 | Nil | Nil | Nil |
| L-4 | Nil | Nil | Nil |
| L-5 | Nil | Nil | Nil |

TABLE 9-continued

| Type of Composition | Fuming | Coating Film peeling | Burning trace |
|---|---|---|---|
| L-6 | Nil | Nil | Nil |
| L-7 | Nil | Nil | Nil |

Experiment 6 has disclosed that the formed films of the compositions of the invention are nonflammable.

Experiment 7

Table 10 shows the results of measurements of the hardness of the coating films formed by the compositions of the invention. Pencils having different hardness were used in the measurements. Scratching was made with the core of each pencil applied to the surface of the coating film. There are shown the maximum values in the hardness of the respective pencils within the range of leaving no scar on the coating film.

TABLE 10

| Coating Film Hardness | |
|---|---|
| Type of Composition | Pencil hardness |
| N-5 | 7H |
| N-6 | 7H |
| K-5 | 7H |
| K-6 | 7H |
| L-5 | 5H |
| L-6 | 5H |

Experiment 7 has disclosed that the compositions of the invention can form a hard coating film.

The compositions of the invention may be coated on, for example, indoor concrete, stone, and wood, so as to serve purposes such as odor elimination, nicotine decomposition, decomposition of volatile organic matter that can cause sick house syndrome, and antibacterial activity against *Escherichia coli, Pseudomonas aeruginosa*, yellow *Staphylococcus*, and Methicilin-Resistant *Staphylococcus Aureus* (MRSA), as well as the maintenance of sanitation. Alternatively, the compositions may be coated on metal so as to form a nonflammable decorative film, allowing it to perform the above actions. Hence, the compositions of the invention can be used in such a wide range of applications as could not be handled satisfactorily in the past.

What is claimed is:

1. A composition for coating obtained by incorporating radioactive material (b), having an average particle length or average particle diameter of not more than 0.1 micron in an amount of 0.1 to 30 parts by weight, into alkali silicate (a) having the general formula of $M_2OnSiO_2$ wherein M is Na, K, or Li; and n is a natural number), in an amount of 0.1 to 30 parts by weight, in terms of $SiO_2$, said composition also containing 0 to 70 parts by weight of inorganic filler (c); and 3 to 90 parts by weight of water (d), provided (a)+(b)+(c)+(d) =100 parts by weight.

2. The composition for coating according to claim 1 that contains: 1 to 25 parts by weight, in terms of $SiO_2$, of the alkali silicate (a).

3. The composition for coating according to claim 1 wherein, the radioactive material (b) is non-water-soluble material and is at least one selected from the group consisting of ore having radioactivity and ceramic.

4. The composition for coating according to claim 1 wherein, the inorganic filler (c) is non-water-soluble and has an average particle dimension or average length of 0.1 to 100 μm, and is at least one selected from the group consisting of inorganic body pigment, inorganic pigment, and metal.

5. A coating film having water resistance, acid resistance, and non-flammability formed by a composition for coating according to one of claims 1 to 4.

6. The composition of claim 1 wherein said radioactive material is monazite.

7. A composition for coating obtained by incorporating radioactive material (b), in an amount of 0.1 to 30 parts by weight, into alkali silicate (a) having the general formula of $M_2O$ $nSiO_2$ wherein M is K, or Li; and n is a natural number), in an amount of 0.1 to 30 parts by weight, in terms of $SiO_2$, said composition also containing 0 to 70 parts by weight of inorganic filler (c); and 3 to 90 parts by weight of water (d), provided (a)+(b)+(c)+(d) =100 parts by weight.

8. The composition for coating according to claim 7 that contains: 1 to 25 parts by weight, in terms of $SiO_2$, of the alkali silicate (a).

9. The composition for coating according to claim 7 wherein, the radioactive material (b) is non-water-soluble material having an average particle diameter or average length of not more than 100 μm, and is at least one selected from the group consisting of ore having radioactivity and ceramic.

10. The composition for coating according to claim 7 wherein, the inorganic filler (c) is non-water-soluble and has an average particle dimension or average length of 0.1 to 100 μm, and is at least one selected from the group consisting of inorganic body pigment, inorganic pigment, and metal.

11. A coating film having water resistance, acid resistance, and non-flammability formed by a composition for coating according to one of claims 7 to 10.

12. The composition of claim 7 wherein said radioactive material is monazite.

* * * * *